United States Patent
Levin et al.

(10) Patent No.: US 11,156,755 B2
(45) Date of Patent: Oct. 26, 2021

(54) ALIGNING A POLARIZATION DEVICE USING A SPATIALLY VARIANT POLARIZATION ELEMENT

(71) Applicant: Facebook Technologies, LLC, Menlo Park, CA (US)

(72) Inventors: Kieran Tobias Levin, Union City, CA (US); Evan Mark Richards, Fremont, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 379 days.

(21) Appl. No.: 16/368,111

(22) Filed: Mar. 28, 2019

(65) Prior Publication Data

US 2020/0310067 A1 Oct. 1, 2020

(51) Int. Cl.
*G02B 5/30* (2006.01)
*G02B 27/28* (2006.01)
*G01J 4/04* (2006.01)
*G02B 7/00* (2021.01)

(52) U.S. Cl.
CPC ............... *G02B 5/30* (2013.01); *G01J 4/04* (2013.01); *G02B 5/3025* (2013.01); *G02B 27/28* (2013.01); *G02B 7/005* (2013.01)

(58) Field of Classification Search
CPC ........ G02B 7/005; G02B 5/3025; G02B 5/30; G02B 27/28; G01J 4/04
See application file for complete search history.

(56) References Cited

U.S. PATENT DOCUMENTS

| 6,275,291 B1 | 8/2001 | Abraham et al. |
| 2018/0039052 A1 | 2/2018 | Khan et al. |
| 2018/0101020 A1* | 4/2018 | Gollier ............... G02B 27/0172 |

FOREIGN PATENT DOCUMENTS

WO 2013157113 10/2013

OTHER PUBLICATIONS

PCT/US2020/018519 Search Report dated May 28, 2020.
https://www.thorlabs.com/newgrouppage9.cfm?objectgroup_id-870. . . Website printed Mar. 28, 2019.

* cited by examiner

*Primary Examiner* — Darryl J Collins
*Assistant Examiner* — Tamara Y. Washington
(74) *Attorney, Agent, or Firm* — Pequignot + Myers; Matthew A. Pequignot

(57) ABSTRACT

An alignment apparatus for a polarization device includes a polarizer subassembly for polarizing a light beam, a rotary support for rotatably supporting the polarization device in a path of the light beam downstream of the polarizer subassembly, an analyzer subassembly downstream of the rotary support for receiving the light beam propagated through the polarization device, and a photodetector array disposed downstream of the analyzer subassembly and extending along the width dimension of the light beam for detecting the light beam propagated through the analyzer subassembly. At least one of the polarizer or analyzer subassemblies includes a spatially variant polarization element having a polarization property varying along the width dimension of the light beam.

9 Claims, 17 Drawing Sheets

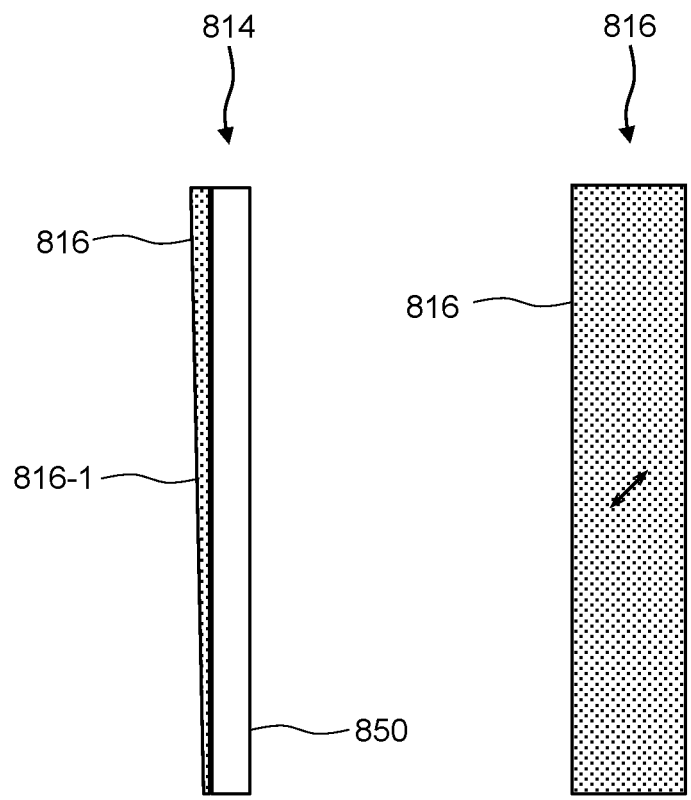
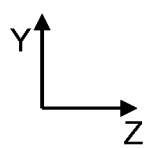 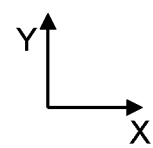
FIG. 8A    FIG. 8B

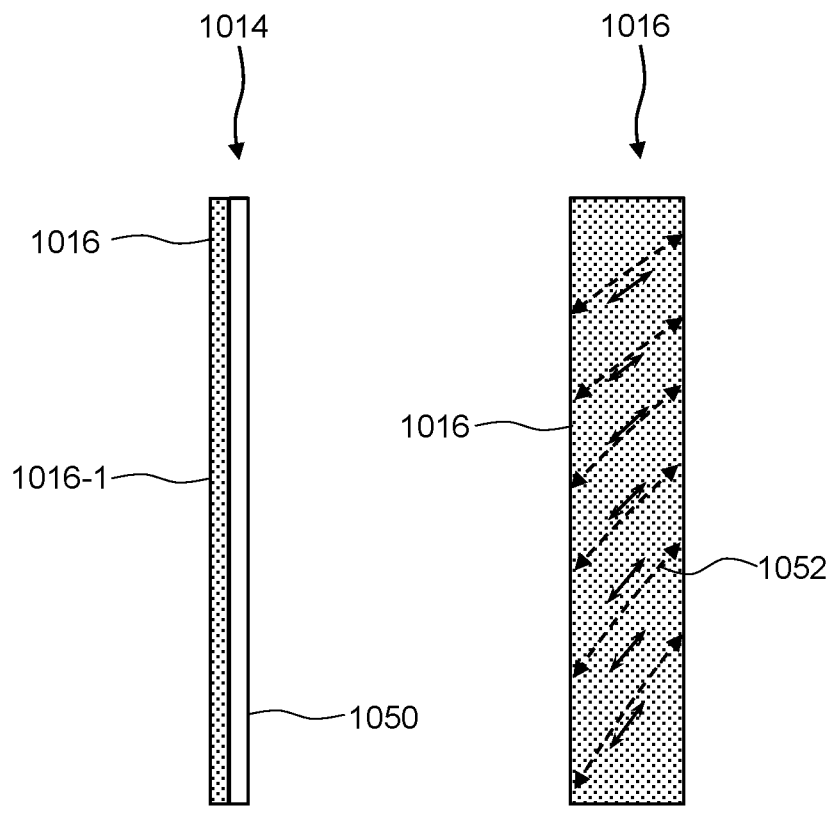
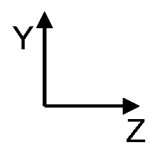 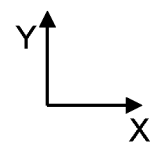

ALIGNING A POLARIZATION DEVICE USING A SPATIALLY VARIANT POLARIZATION ELEMENT

TECHNICAL FIELD

The present disclosure relates to optical equipment manufacturing, and in particular to devices and methods for alignment and assembly of polarization-based optical devices.

BACKGROUND

Polarization properties of light can be used for remote sensing, imaging, glare removal, redirection and switching of optical beams, providing a 3D viewing effect, etc. Polarization-based optical devices often include elements such as polarizers and waveplates. Polarization optical elements need to be precisely oriented to ensure intended operation of the device. For example, to obtain circularly-polarized light, one may use a linear optical polarizer stacked with a quarter-wave waveplate having an optic axis oriented exactly at 45 degrees with respect to a transmission axis of the linear optical polarizer. If the linear polarizer is oriented at a different angle w.r.t. the optic axis of the waveplate, an elliptical or even linear polarization may result.

Head-mounted displays (HMDs), near-eye displays (NEDs), and other display systems, including wearable displays, often use polarization elements and devices that transform optical polarization of light beams to redirect and switch the light beams. Folded optical beam configurations may be used to provide compact lenses for the displays. To achieve folded beam configurations, polarization rotators may be combined with transmissive and/or reflective polarizers. During assembly of polarization-based optical devices with folded beam configurations, individual polarization components need to be rotated at precise angles. The rotation angles of polarization components in an assembly jig are often determined by trial and error, one by one. Tedious and time-consuming optical assembly of polarization-based devices increases their manufacturing costs.

SUMMARY

In accordance with the present disclosure, there is provided an alignment apparatus for a polarization device. The alignment apparatus includes a polarizer subassembly for polarizing a light beam having a width along a first axis, a rotary support for rotatably supporting the polarization device in a path of the light beam downstream of the polarizer subassembly, an analyzer subassembly downstream of the rotary support for receiving the light beam propagated through the polarization device, and a photodetector array downstream of the analyzer subassembly, the photodetector array extending along the first axis for detecting the light beam propagated through the analyzer subassembly. At least one of the polarizer or analyzer subassemblies includes a spatially variant polarization element having a polarization property varying along the first axis.

The polarizer subassembly may include a linear transmission polarizer, and the analyzer subassembly may include the spatially variant polarization element. The polarizer subassembly may further include a quarter-wave waveplate downstream of the linear transmission polarizer. The polarizer subassembly may include the spatially variant polarization element, and the analyzer subassembly may include a linear transmission polarizer. The analyzer subassembly may further include a quarter-wave waveplate upstream of the linear transmission polarizer.

In some embodiments, the spatially variant polarization element includes an array of polarizer segments, the array extending along the first axis. A transmission axis direction of the polarizer segments may vary from a polarizer segment to a polarizer segment of the array. In some embodiments, the spatially variant polarization element comprises a linear transmission polarizer extending along the first axis and having a transmission axis direction smoothly and continuously varying along the first axis.

In some embodiments, the spatially variant polarization element includes an array of half-wave waveplate segments, the array extending along the first axis, and a linear polarizer downstream of the array. An optic axis direction of the half-wave waveplate segments of the array may vary from a half-wave waveplate segment to a half-wave waveplate segment of the array. In some embodiments, the spatially variant polarization element includes a half-wave optical retarder extending along the first axis and having an optic axis direction smoothly and monotonically varying along the first axis, and a linear polarizer downstream of the half-wave optical retarder.

In some embodiments, the spatially variant polarization element includes an array of optical retarders, the array extending along the first axis. At least one of a retardation or an optic axis direction of the optical retarders of the array may vary from an optical retarder to an optical retarder of the array. For example, the retardation of the optical retarders of the array varies between 0.2 and 0.3 wavelengths of the light beam. In some embodiments, the spatially variant polarization element includes an optical retarder extending along the first axis and having at least one of an optical retardation or an optic axis direction smoothly and continuously varying along the first axis. The polarization device may include a pancake lens polarization component.

In accordance with the present disclosure, there is provided an alignment system for aligning a polarization device. The alignment system includes a light source for providing a first light beam having a width along a first axis, a first spatially variant polarization element having a polarization property varying along the first axis for receiving and polarizing the first light beam, and a first alignment apparatus comprising a first rotary support for rotatably supporting a first polarization component of the polarization device in a path of the first light beam and a first photodetector array disposed downstream of the first spatially variant polarization element. The first photodetector array extends along the first axis for detecting the first light beam propagated through the first spatially variant polarization element.

In some embodiments, the light source is configured for providing a second light beam having a width along a second axis, and the alignment system further includes a second alignment apparatus. The second alignment apparatus includes a second rotary support for rotatably supporting a second polarization component of the polarization device in a path of the second light beam, a second spatially variant polarization element having a polarization property varying along the first axis and disposed downstream of the second rotary support for receiving the second light beam propagated through the second polarization component, and a second photodetector array disposed downstream of the second spatially variant polarization element and extending along the second axis for detecting the second light beam propagated through the second spatially variant polarization element. The alignment system may further include a translation stage for combining the first and second polarization components of the polarization device after aligning by the first and second alignment apparatuses, respectively. The polarization device may include a pancake lens.

In accordance with the present disclosure, there is further provided a method for aligning a polarization device including polarizing a light beam having a width along a first axis by a polarizer subassembly, rotatably supporting the polarization device in a path of the light beam by a rotary support, receiving the light beam propagated through the polarization device at an analyzer subassembly, and detecting the light beam propagated through the analyzer subassembly by a photodetector array disposed downstream of the analyzer subassembly and extending along the first axis. At least one of the polarizer or analyzer subassemblies includes a spatially variant polarization element having a polarization property varying along the first axis.

In some embodiments, the method further includes obtaining an optical power distribution of the light beam detected by the photodetector array, obtaining a rotation angle of the polarization device to make the optical power distribution match a pre-determined optical power distribution, and rotating the rotary support by the rotation angle.

BRIEF DESCRIPTION OF THE DRAWINGS

Exemplary embodiments will now be described in conjunction with the drawings, in which:

FIG. 8A is a side cross-sectional view of an optical retarder having a continuously variable thickness and retardation;

FIG. 8B is a plan view of the optical retarder of FIG. 8A;

FIG. 10A is a side cross-sectional view of a quarter-wave optical retarder having a continuously variable optic axis direction;

FIG. 10B is a plan view of the optical retarder of FIG. 10A;

DETAILED DESCRIPTION

Figure 1:
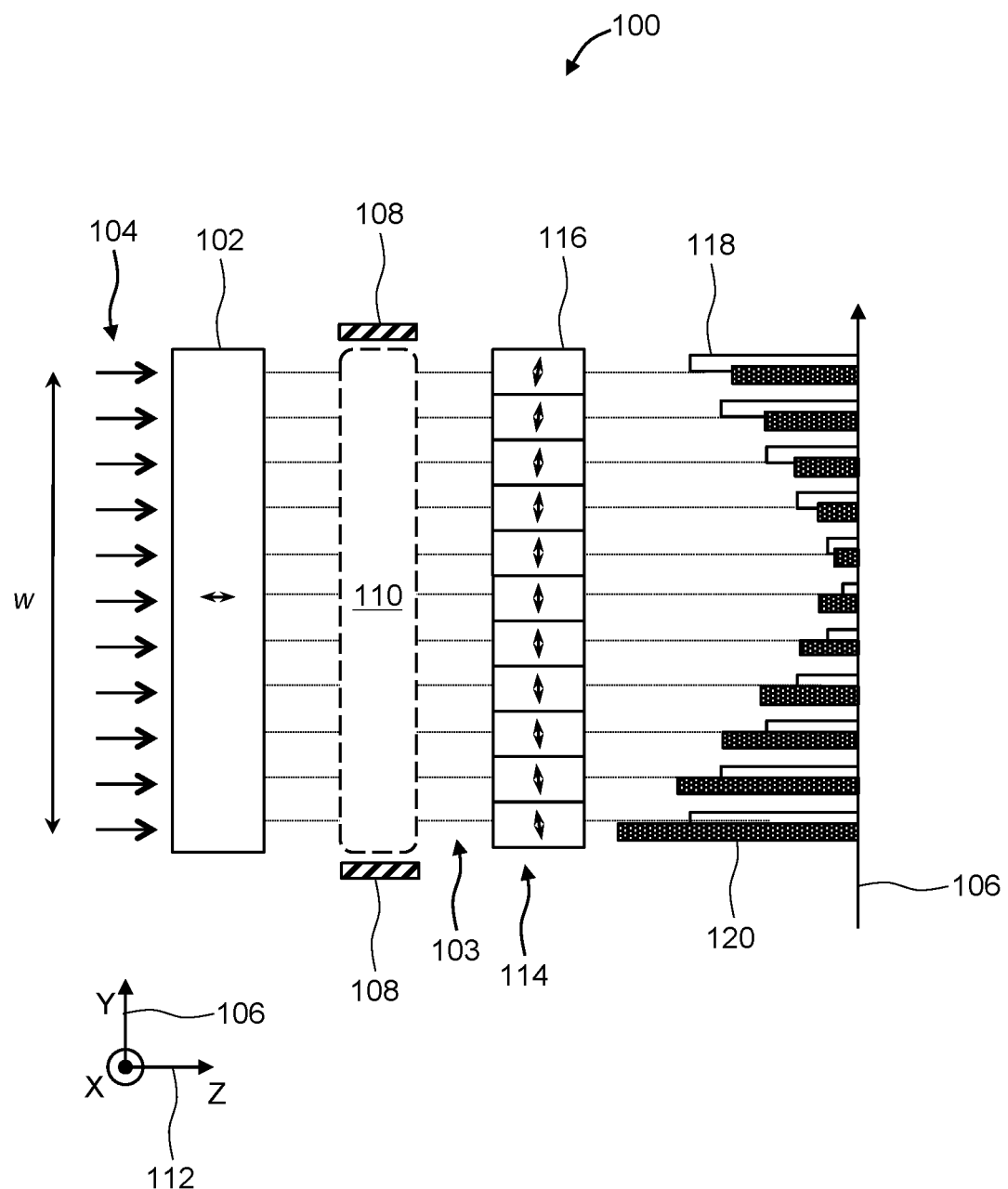
FIG. 1 is a schematic view of an alignment apparatus for a polarization device and a graph of an optical power distribution on a detector array, in accordance with an embodiment of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2A-2H, 3A-3B to 10A-10B, FIG. 11, and FIG. 12, similar reference numerals denote similar elements.

A polarization device can be aligned to provide a desired polarization at the output. For example, a linear transmission polarizer may be aligned to provide a vertical output polarization. To make sure that the polarization is indeed vertical, a second polarizer, termed "analyzer", may be rotated in an optical path downstream of the linear transmission polarizer, and an optical power level of light transmitted by the analyzer may be monitored. When the transmitted light is at minimum, the analyzer orientation is at 90 degrees w.r.t. the polarizer orientation. This allows one to determine the current orientation of the linear transmission polarizer from the orientation of the analyzer, which can be precisely known e.g. from a previously performed calibration.

In accordance with the present disclosure, at least one of the polarizer for providing input polarized light, or analyzer for determining the polarization state of the output light may include a spatially variant polarization element. An array of photodetectors may be disposed downstream of the analyzer for parallel detection of optical power level at a plurality of locations at the same time. This enables the analyzer to be stationary, i.e. no rotation of the analyzer may be required to determine the polarization state of the output light and, accordingly, to determine an angle by which a polarization device needs to be rotated for optimal alignment. The parallel detection of polarized output light can make the alignment much quicker. Furthermore, since the light detection is performed in parallel, time variation of optical power level of the light source can no longer contribute to the measurement error.

Referring to FIG. 1, an alignment apparatus 100 for aligning a polarization device 110 includes a polarizer subassembly 102 for polarizing a light beam 104 having a width w along Y-axis 106. A rotary support 108 is disposed downstream of the polarizer subassembly 102. The rotary support 108 supports the polarization device 110 in a path 103 of the light beam 104, such that the polarization device 110 can be rotated about Z-axis 112, which is parallel to the direction of propagation of the light beam 104 in this example. The polarization device 110 can include a reflective or transmissive polarizer, a waveplate, an optical element such as a lens with laminated polarizer and/or a waveplate, an optical retarder film, a Pancharatnam-Berry phase (PBP) liquid crystal (LC) lens or grating, a volume holographic grating or lens, a hyperbolic metamaterial, etc. The polarization device 110 can also include any combination of the above polarization components.

An analyzer subassembly 114 is disposed in the path 103 of the light beam 104 downstream of the rotary support 108. The analyzer subassembly 114 receives the light beam 104 propagated through the polarization device 110. In this example, the analyzer subassembly 114 includes an array of linear transmission polarizer segments 116 extending along the Y-axis 106 and having a transmission axis direction varying from the segment 116 to the segment 116 in going along the Y-axis 106. The transmission axis direction depends linearly on a position of the segments 116 along the Y-axis 106. For the segments 116 of equal size, a difference between transmission axis direction of neighboring segments 116 can be constant, e.g. 0.2 degree, 0.5 degree, 1 degree, etc. The linear polarization transmission axis directions are shown with double-headed arrows. It is noted that the polarizer subassembly 102 and the analyzer subassembly 114 are rotated in FIG. 1 to be in plan view, for convenience of illustration of the transmission axis direction.

A nominal optical power distribution 118 along the Y-axis 106, corresponding to a desired orientation of the polarization device 110, is shown in FIG. 1 with white horizontal blocks perpendicular to the Y-axis 106. In this example, the nominal optical power distribution 118 is symmetrical about a center axis parallel to the Z-axis 112. An "actual" optical power distribution 120, that is, a measured optical power distribution with the polarization device 110 rotated away from the desired orientation, is asymmetric, with a minimum power reading shifted upwards in FIG. 1. The actual optical power distribution 120 is shown in FIG. 1 with shaded horizontal blocks perpendicular to the Y-axis 106. By measuring the actual optical power distribution 120, one can determine an angle by which the polarization device 110 needs to be rotated in the rotary support 108 to arrive at the nominal optical power distribution 118, which may be pre-determined. A single measurement of such optical power distribution can be sufficient to determine the correct orientation of the polarization device 110. Once the correct orientation has been determined, the polarization device 110 may be rotated accordingly, and the optical power distribution may be measured again to verify.

Figure 2A:
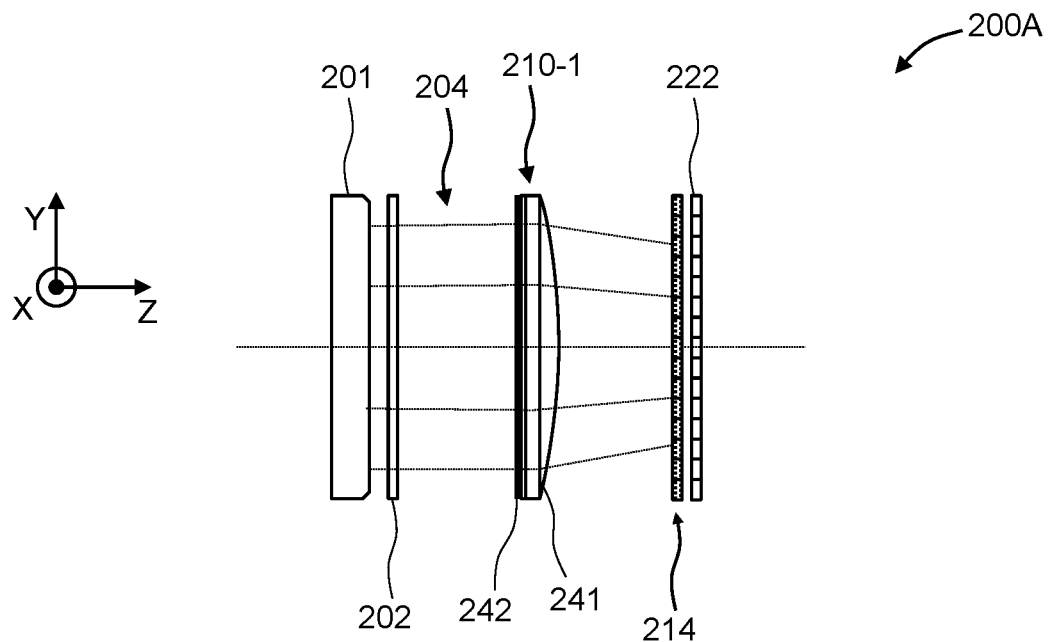
FIG. 2A is a side cross-sectional view of an alignment apparatus for a polarization device, the alignment apparatus including a uniform linear transmission polarizer and a segmented linear transmission analyzer.

Example embodiments of the alignment apparatus 100 of FIG. 1 will be considered with reference to FIGS. 2A to 2H. Referring first to FIG. 2A, an alignment apparatus 200A for assembly of a polarization device, e.g. a pancake lens, may include a light source 201 extending along Y-axis for providing a light beam 204 of a finite width along Y-axis, i.e. extending vertically in FIG. 2A. A uniform linear transmission polarizer 202 polarizes the light beam 204. The uniform linear transmission polarizer 202 is an example of the polarizer subassembly 102 of the alignment apparatus 100 of FIG. 1. A first polarization component 210-1 of the pancake lens (FIG. 2A) is supported by a rotary support (not shown for brevity). The first polarization component 210-1 includes a downstream-facing plano-convex lens 241 and a reflective polarizer 242 mounted, e.g. laminated, onto a flat surface of the downstream-facing plano-convex lens 241. The first polarization component 210-1 is an example of the polarization device 110 of the alignment apparatus 100 of FIG. 1. A segmented linear transmission polarizer 214 (FIG. 2) is disposed downstream of the first polarization component 210-1. The segmented linear transmission polarizer 214 is an example of the analyzer subassembly 114 of the alignment apparatus 100 of FIG. 1, i.e. the polarization element(s) downstream of the polarization device(s) to be aligned. A photodetector array 222 is disposed downstream of the segmented linear transmission polarizer 214. The photodetector array 222 extends along Y-axis. In operation, the photodetector array 222 detects the light beam 204 propagated through the segmented linear transmission polarizer 214. The first polarization component 210-1 of the pancake lens may slightly focus the light beam 204, as shown. The focusing effect can be taken into account by a corresponding re-scaling of optical power distribution obtained by the photodetector array 222. It is noted that the first polarization component 210-1 is only a non-limiting example of a polarization device that can be aligned.

The principle of alignment of the first polarization component 210-1 is similar to that of the alignment apparatus 100 of FIG. 1. Briefly, a nominal rotation angle of the first polarization component 210-1 corresponds to a pre-determined optical power density distribution at the photodetector array 222, for example to a pre-determined nominal location of a minimum of that distribution. When the first polarization component 210-1 is disposed at an angle different from the nominal angle, a local minimum of the optical power density distribution detected by the photodetector array 222 will be at different location. The difference between the nominal and measured locations of the minima of the optical power density distributions can be indicative of the angle by which the first polarization component 210-1 needs to be rotated to be properly aligned.

Figure 2B:
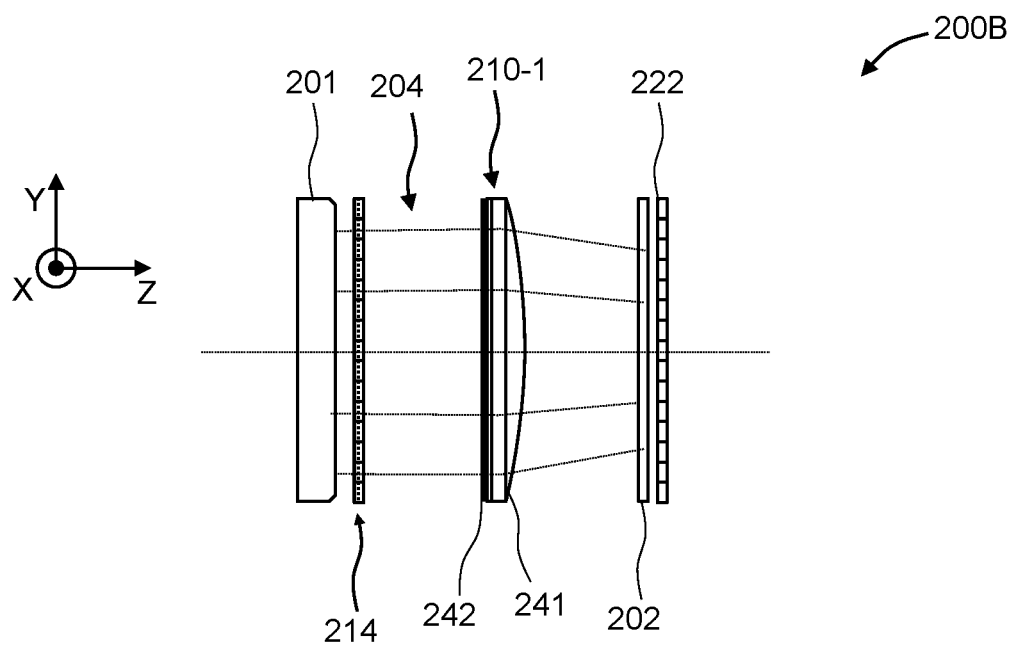
FIG. 2B is a side cross-sectional view of an alignment apparatus for a polarization device, the alignment apparatus including a segmented linear transmission polarizer and a uniform linear transmission analyzer.

Turning to FIG. 2B, an alignment apparatus 200B is a variant of the alignment apparatus 200A of FIG. 2A. In the alignment apparatus 200B of FIG. 2B, the uniform 202 and segmented 214 linear transmission polarizers are swapped, that is, the segmented linear transmission polarizer 214 is disposed upstream of the first polarization component 210-1 and thus acts as a polarizer, and the uniform linear transmission polarizer 202 is disposed downstream of the first polarization component 210-1 and thus acts as an analyzer. The alignment process in this case is similar. It is noted that in the alignment apparatus 200B of FIG. 2B, the uniform linear transmission polarizer 202 in front of the photodetector array 222 may be omitted.

Figure 2C:
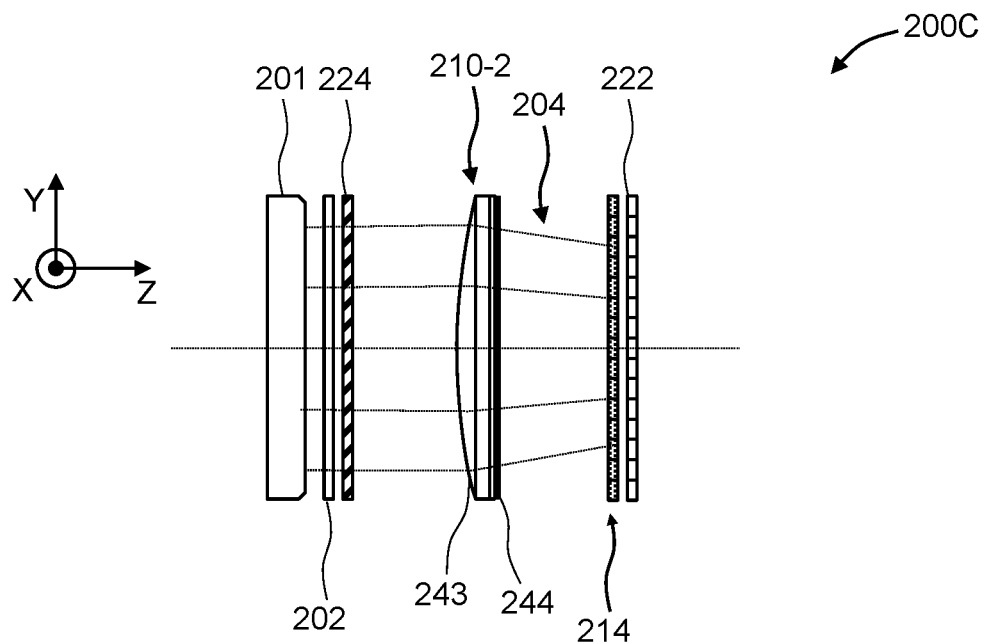
FIG. 2C is a side cross-sectional view of an alignment apparatus for a polarization device, the alignment apparatus including a quarter-wave waveplate downstream of a uniform linear polarizer, for providing circularly polarized illuminating light, and a segmented linear transmission analyzer.

Referring to FIG. 2C, an alignment apparatus 200C for assembly of a polarization device, e.g. a pancake lens, may include the light source 201 extending along Y-axis for providing the light beam 204 of a finite width along Y-axis. The uniform linear transmission polarizer 202 polarizes the light beam 204. A quarter-wave waveplate 224 is disposed downstream of the uniform linear transmission polarizer 202. An optic axis of the quarter-wave waveplate 224 can be at 45 degrees w.r.t. the transmission axis of the uniform linear transmission polarizer 202, causing the optical beam 204 to become circularly polarized. In other words, the polarizer subassembly of the alignment apparatus 200C includes the uniform linear transmission polarizer 202 and the quarter-wave waveplate 224, and functions as a circular polarizer. Other known configurations of circular polarizer may also be used in the alignment apparatus 200C.

A second polarization component 210-2 of the pancake lens can be held by a rotary support, which is not shown for brevity. The second polarization component 210-2 includes an upstream-facing plano-convex lens 243 and a quarter-wave optical retarder film 244 mounted, e.g. laminated, onto a flat surface of the upstream-facing plano-convex lens 243. The analyzer subassembly of the alignment apparatus 200C of FIG. 2C includes the segmented linear transmission polarizer 214, similarly to the alignment apparatus 100 of FIG. 1 and the alignment apparatus 200A of FIG. 2A. In operation, the circularly polarized light beam 204 becomes linearly polarized upon propagating through the quarter-wave optical retarder film 244 of the second polarization component 210-2. The linearly polarized light 204 impinges onto the segmented linear transmission polarizer 214, which functions as an analyzer. The photodetector array 222 detects the optical power density distribution downstream of the segmented linear transmission polarizer 214. The measured optical power distribution is indicative of the rotation angle of the second polarization component 210-2, and may be adjusted to the nominal rotation angle as explained above.

Figure 2D:
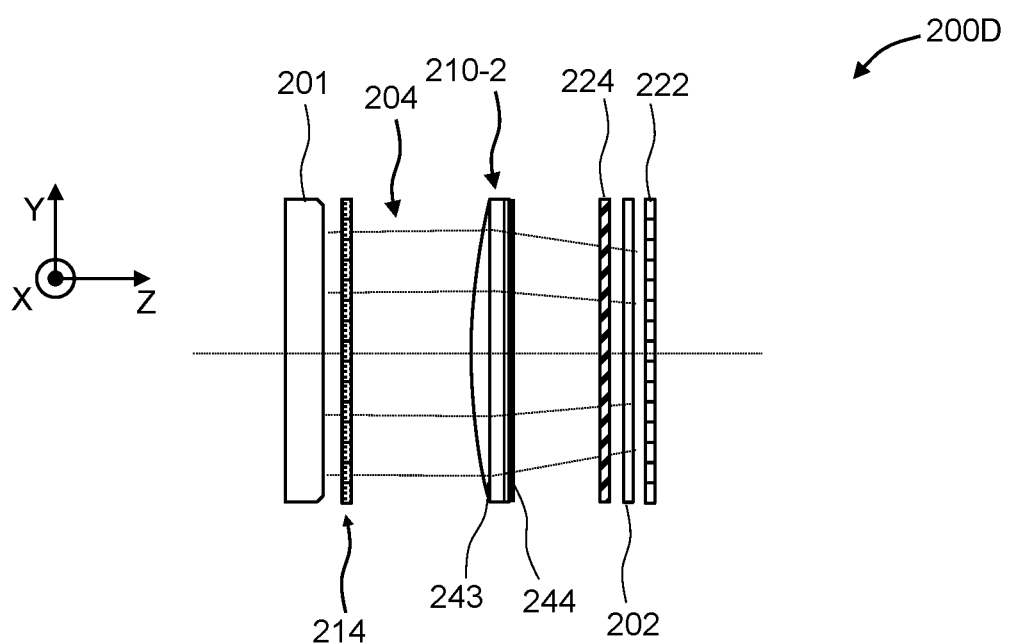
FIG. 2D is a side cross-sectional view of an alignment apparatus for a polarization device, the alignment apparatus including a segmented linear transmission polarizer and a quarter-wave waveplate upstream of a uniform linear transmission analyzer.

An alignment apparatus 200D of FIG. 2D is a variant of the alignment apparatus 200C of FIG. 2C. In the alignment apparatus 200D of FIG. 2D, the polarizer and analyzer subassemblies are swapped: the segmented linear transmission polarizer 214 is used to polarize the light beam 204, and the combination of the quarter-wave waveplate 224 and the uniform linear transmission polarizer 202 is used to analyze the light beam 204 by providing polarization-dependent light attenuation. In the analyzer subassembly of the alignment apparatus 200D of FIG. 2D, the quarter-wave waveplate 224 is disposed upstream of the uniform linear transmission polarizer 202.

In some embodiments, the optic axes directions of the quarter-wave optical retarder film 244 and the quarter-wave waveplate 224 are parallel to one another. As a result, the optical retardations of the quarter-wave optical retarder film 244 and the quarter-wave waveplate 224 add up to half-wave retardation, which rotates the linear polarization of the impinging optical beam 204 by twice the angle between a direction of linear polarization of the impinging optical beam 204 and the optic axes directions of the quarter-wave optical retarder film 244 and the quarter-wave waveplate 224. In some embodiments, the optic axes directions of the quarter-wave optical retarder film 244 and the quarter-wave waveplate 224 are perpendicular to each other, causing the optical retardations of the quarter-wave optical retarder film 244 and the quarter-wave waveplate 224 to cancel each other's retardation, which preserves the orientation of linear polarization of the impinging optical beam 204.

Figure 2E:
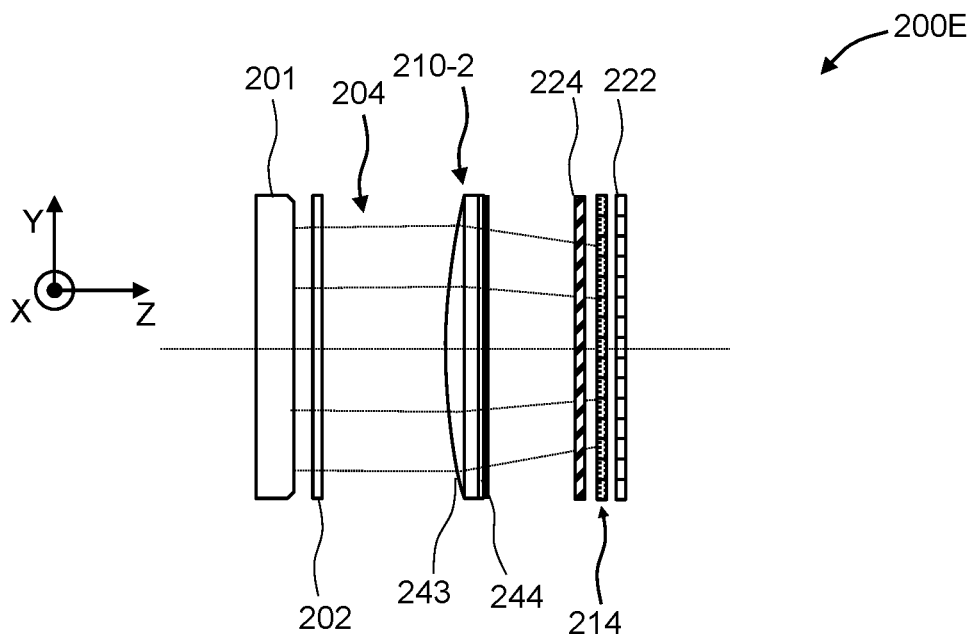
FIG. 2E is a side cross-sectional view of an alignment apparatus for a polarization device, the alignment apparatus including a quarter-wave waveplate upstream of a segmented linear transmission analyzer.
Figure 2F:
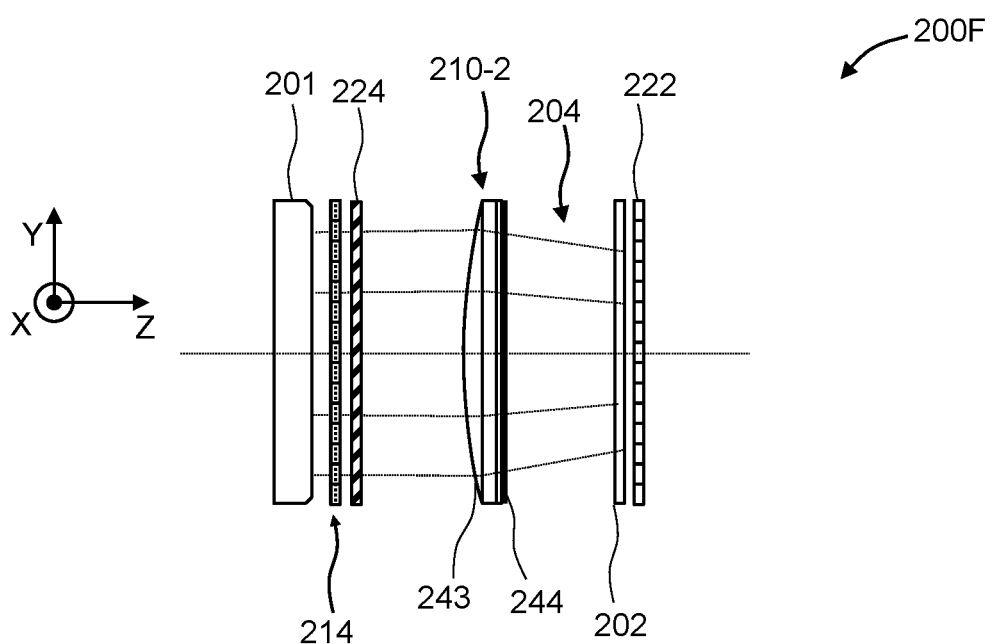
FIG. 2F is a side cross-sectional view of an alignment apparatus for a polarization device, the alignment apparatus including a quarter-wave waveplate downstream of a segmented linear transmission polarizer.

Referring now to FIG. 2E, an alignment apparatus 200E is similar to the alignment apparatus 200C of FIG. 2C. In the alignment apparatus 200E of FIG. 2E, the quarter-wave waveplate 224 is disposed not upstream but downstream of the second polarization component 210-2. The resulting effect is similar, as the optical retardation of the quarter-wave waveplate 224 and the quarter-wave optical retarder film 244 adds up to either a half-wave retardation in one non-limiting embodiment, or to zero retardation in another non-limiting embodiment. Similarly, a difference between an alignment apparatus 200F of FIG. 2F and the alignment apparatus 200D of FIG. 2D is that in the alignment apparatus 200F of FIG. 2F, the quarter-wave waveplate 224 is disposed not downstream but upstream of the second polarization component 210-2. The operation of the alignment apparatus 200F of FIG. 2F is similar to that of the alignment apparatus 200D of FIG. 2D.

Figure 2G:
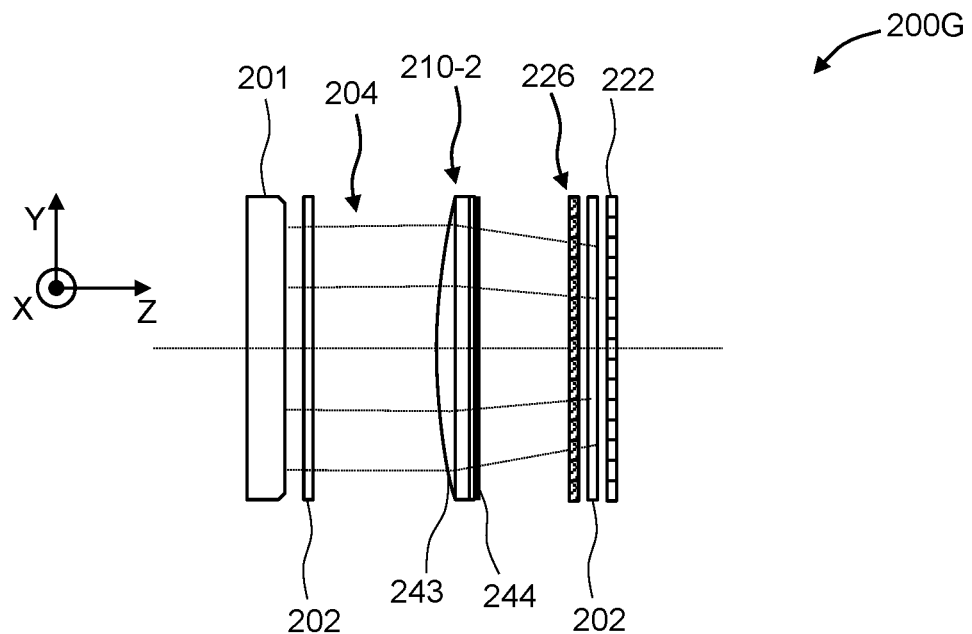
FIG. 2G is a side cross-sectional view of an alignment apparatus for a polarization device, the alignment apparatus including a segmented retarder upstream of a uniform linear transmission analyzer.

Turning to FIG. 2G, an alignment apparatus 200G for assembly of a polarization device, e.g. a pancake lens, may include the light source 201 extending along Y-axis for providing the light beam 204 of a finite width along Y-axis, i.e. extending vertically in FIG. 2G. The polarizer subassembly of the alignment apparatus 200G includes a uniform linear transmission polarizer 202. The polarization device to be aligned—the second polarization component 210-2 of the pancake lens in this example—is supported by a rotary support, which is omitted for brevity. The analyzer subassembly of the alignment apparatus 200G includes an array 226 of optical retarders, followed by the linear transmission polarizer 202. The array 226 extends along Y-axis, that is, vertically in FIG. 2G. At least one an optical retardation or an optic axis direction of the optical retarders of the array 226 varies along Y-axis. By way of a non-limiting example, an optic axis direction may be fixed at 45 degrees w.r.t. the upstream linear transmission polarizer, and the optical retardation the optical retarders of the array 226 may vary from 0.2 wavelengths to 0.3 wavelengths of the light beam 204. The middle optical retarder of the array 226 may have optical retardation of 0.25 wavelength, i.e. may act as a quarter-wave waveplate.

In operation, when the second polarization component 210-2 of the pancake lens is disposed at an optimal rotation (also termed "clocking") angle, the optical retardation of the 244 and the middle optical retarder of the array 226 adds to half-wavelength (or zero wavelengths, depending on relative orientation), causing a local minimum at the optical power density distribution at the photodetector array 222. When the second polarization component 210-2 of the pancake lens is rotated away from this angle, the local minimum may shift and/or change the optical power density level, which indicates that the second polarization component 210-2 is misaligned.

Figure 2H:
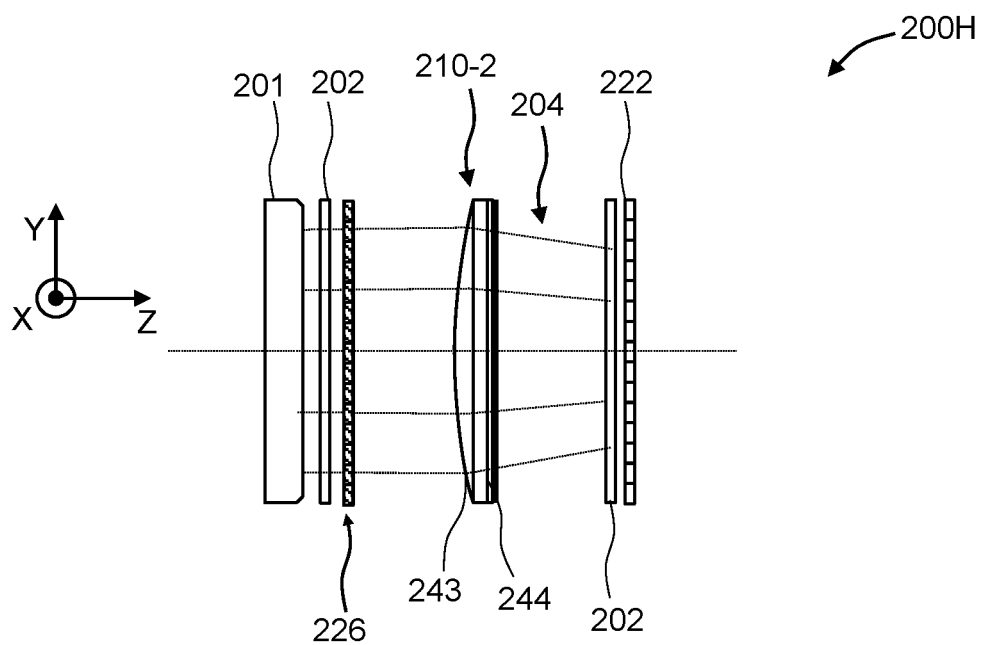
FIG. 2H is a side cross-sectional view of an alignment apparatus for a polarization device, the alignment apparatus including a segmented retarder downstream of a uniform linear transmission polarizer.

Referring now to FIG. 2H, an alignment apparatus 200H is similar to the alignment apparatus 200G of FIG. 2G. In the alignment apparatus 200H of FIG. 2H, the array 226 of optical retarders is disposed not downstream but upstream of the second polarization component 210-2. In other words, the array 226 of optical retarders is a part of polarizer subassembly of the alignment apparatus 200H, not the analyzer subassembly. The principle of operation of the alignment apparatus 200H is similar.

It is to be understood that pancake lens polarization components 210-1, 210-2 are shown in FIGS. 2A-2H as examples only. The alignment apparatuses of FIGS. 2A-2H may be used for alignment of any polarization device including, without limitation, a reflective or transmissive polarizer, a waveplate, an optical element such as a lens with laminated polarizer and/or a waveplate, an optical retarder film, a Pancharatnam-Berry phase (PBP) liquid crystal (LC) lens or grating, a volume holographic grating or lens, a hyperbolic metamaterial, and/or any combination of the above polarization components. Furthermore, the alignment apparatuses 100 of FIGS. 1 and 200A to 200H of FIGS. 2A to 2H, respectively, can be used to determine an optical retardation variation or polarization rotation of any optical element, not necessarily a polarization element. For example, a regular lens may have some spatial variation of optical retardation across its clear aperture, and/or a small spatially varying polarization rotation due to Fresnel refraction on a curved surface. By placing such a lens in the alignment apparatuses 100 of FIGS. 1 and 200A to 200H of FIGS. 2A to 2H and determining optical power distribution at the output, one can characterize the optical retardation and/or polarization rotation spatial variation of the lens under test.

It is further noted that at least one of the polarizer or analyzer subassemblies may include a spatially variant polarization element having a polarization property varying along the first axis. In other words, the spatially variant polarization element may be disposed upstream, downstream, or both upstream and downstream of the polarization device being aligned. In embodiments where the spatially variant polarization element is disposed upstream of the polarization device, the spatially variant polarization element functions as a spatially variant polarizer for polarizing the light beam 104 (FIG. 1) or 204 (FIGS. 2A-2H). When the spatially variant polarization element is disposed downstream of the polarization device, the spatially variant polarization element functions as a spatially variant analyzer for converting the polarization of the light beam 104, 204 into optical power density variation, which may be suitably detected by a photodetector array disposed downstream of the analyzer subassembly.

Figures 3A, 3B:
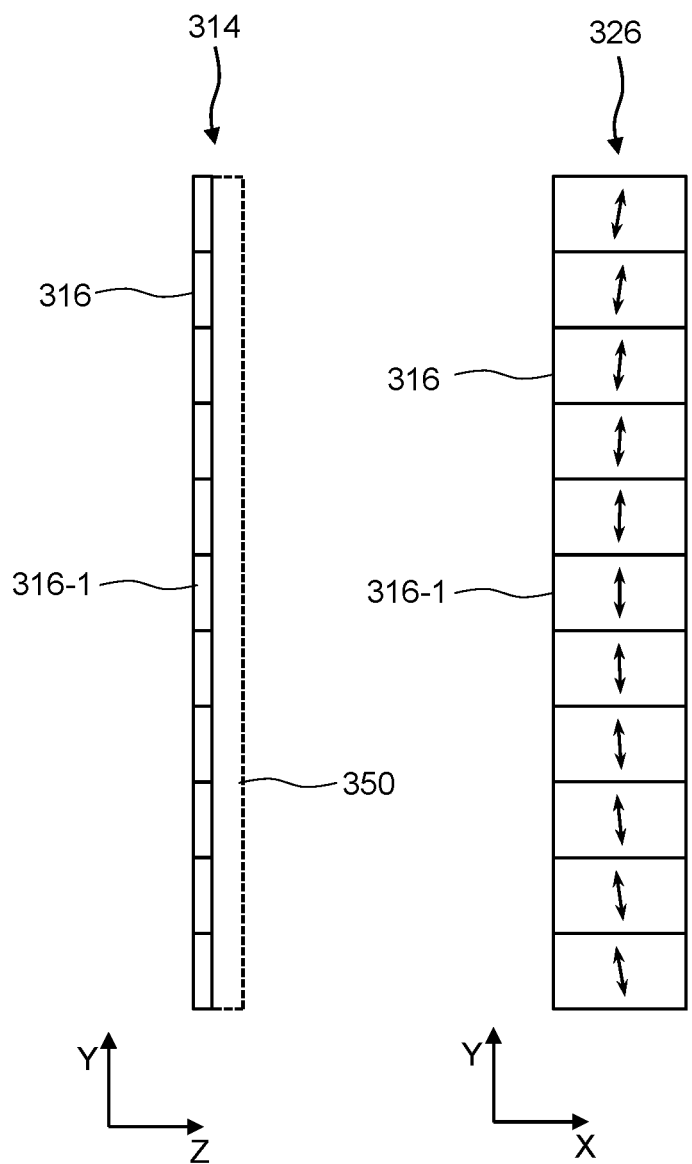
FIG. 3A is a side cross-sectional view of a segmented linear transmission polarizer.
FIG. 3B is a plan view of the segmented linear transmission polarizer of FIG. 3A.

Example embodiments of the spatially variant polarization element usable in the polarizer and/or analyzer subassemblies of the alignment apparatuses of FIG. 1 and FIGS. 2A-2H will now be described in reference to FIGS. 3A, 3B to 10A, 10B. Referring first to FIGS. 3A and 3B, a segmented linear transmission polarizer 314 includes a linear array 326 of transmission polarizer segments 316, which may be supported by an optional substrate 350. The array 326 of the linear transmission polarizer segments 316 extends along Y-axis, which corresponds to a width direction of an extended impinging optical beam, not shown. Each linear transmission polarizer segment 316 is disposed in XY plane. A transmission axis direction of the linear transmission polarizer segments 316, shown with double-sided arrows, varies from one linear transmission polarizer segment 316 to another linear transmission polarizer segment 316 along the Y-axis, that is, in the direction of the array 326, as shown. The variation may be monotonic, e.g. linearly varying with a position of the polarizer segments along Y-axis. The variation of the transmission axis direction may also be non-linear, e.g. square root, quadratic, polynomial, exponential, etc. Furthermore, the variation of the transmission axis direction may be non-monotonic in some embodiments. A selected linear transmission polarizer segment, e.g. a center polarizer segment 316-1, may have a pre-determined transmission axis direction, e.g. vertical as shown in FIG. 3B, horizontal, at 45 degrees, etc.

Figures 4A, 4B:
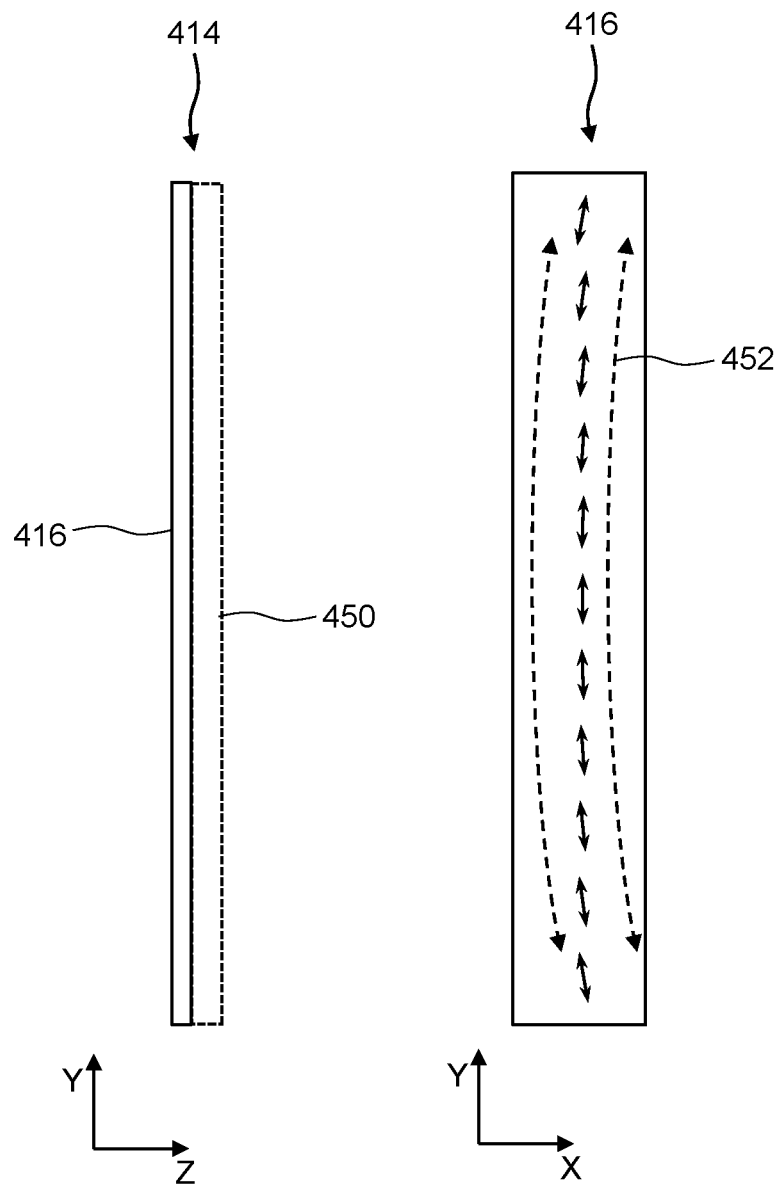
FIG. 4A a side cross-sectional view of a linear transmission polarizer having a continuously variable transmission axis direction.
FIG. 4B is a plan view of the linear transmission polarizer of FIG. 4A.

Referring to FIGS. 4A and 4B, a continuously spatially variant linear transmission polarizer 414 includes a polymer-based polarizer sheet 416 supported by a substrate 450. The polymer-based polarizer sheet 416 includes an in-plane bend 452, as shown in FIG. 4B. The bend is in the plane of the substrate 450, that is, in XY plane, and has a radius of curvature on that plane. The bend may be achieved e.g. by heating and stretching the polymer polarizer sheet. The in-plane bend 452 causes the transmission axis direction to vary smoothly and continuously along Y-axis, as shown with double-headed arrows. The continuously variant linear transmission polarizer 414 operates similarly to the segmented linear transmission polarizer 314 of FIGS. 3A and 3B. Other materials may be used instead of the polymer sheet.

Figures 5A, 5B:
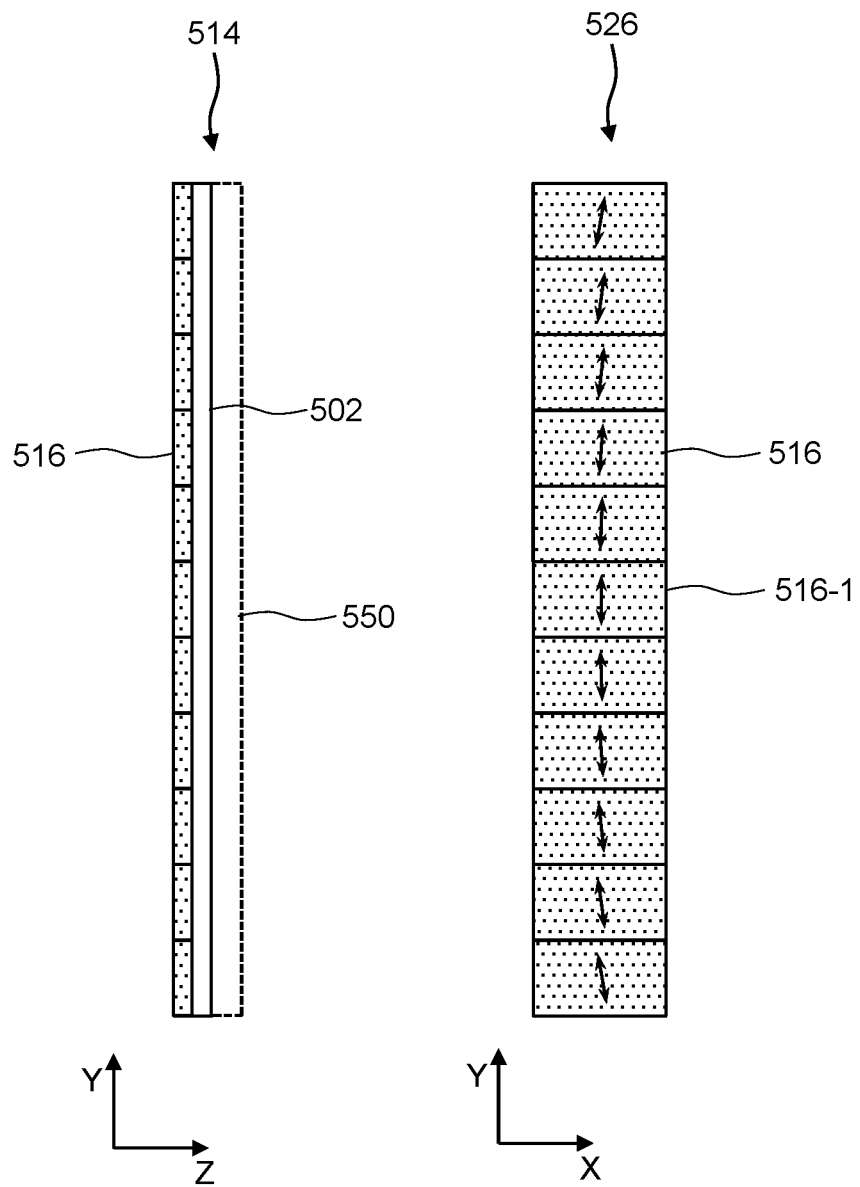
FIG. 5A is a side cross-sectional view of a segmented half-wave waveplate stacked with a linear transmission polarizer.
FIG. 5B is a plan view of the segmented half-wave waveplate of FIG. 4A.

Referring to FIGS. 5A and 5B, a segmented compound polarizer 514 includes a uniform linear transmission polarizer 502 supported by, e.g. laminated on, an optional substrate 550. An array 526 of half-wave waveplate segments 516 may be supported by the uniform linear transmission polarizer 502. The uniform linear transmission polarizer 502 and the half-wave waveplate segments 516 are disposed parallel to each other and to the XY plane. The array 526 extends along Y-axis, i.e. along a width direction of an extended impinging optical beam. An optic axis direction of the half-wave waveplate segments 516 of the array 526, shown with double-sided arrows, varies along the Y-axis in going from one half-wave waveplate segments 516 to another half-wave waveplate segments 516, as shown. The variation of the transmission axis direction may be linear or non-linear, e.g. square root, quadratic, polynomial, exponential, etc. Furthermore, the variation of the transmission axis direction may be non-monotonic in some embodiments. A selected linear transmission polarizer segment, e.g. a center polarizer segment 516-1, may have a pre-determined transmission axis direction, e.g. vertical as shown in FIG. 3B, horizontal, at 45 degrees, etc.

In operation, the half-wave waveplate segments 516 rotate a polarization of an impinging light beam by an angle dependent on the optic axis direction of the half-wave waveplate segments 516. Thus, the half-wave waveplate segments 516 create an effect similar to rotation of the transmission axis direction by individual transmission polarizer segments. Accordingly, the segmented compound polarizer 514 operates similarly to the array 326 of the linear transmission polarizer segments 316 of FIGS. 3A and 3B, providing a similar optical power density distribution at the output. The order of the array 526 and the linear transmission polarizer 502 on the substrate 550 may be reversed. For polarizer configurations, the array 526 is disposed downstream of the linear transmission polarizer 502 in the optical path of the light beam. For analyzer configurations, the array 526 is disposed upstream of the linear transmission polarizer 502 in the optical path of the light beam.

Figures 6A, 6B:
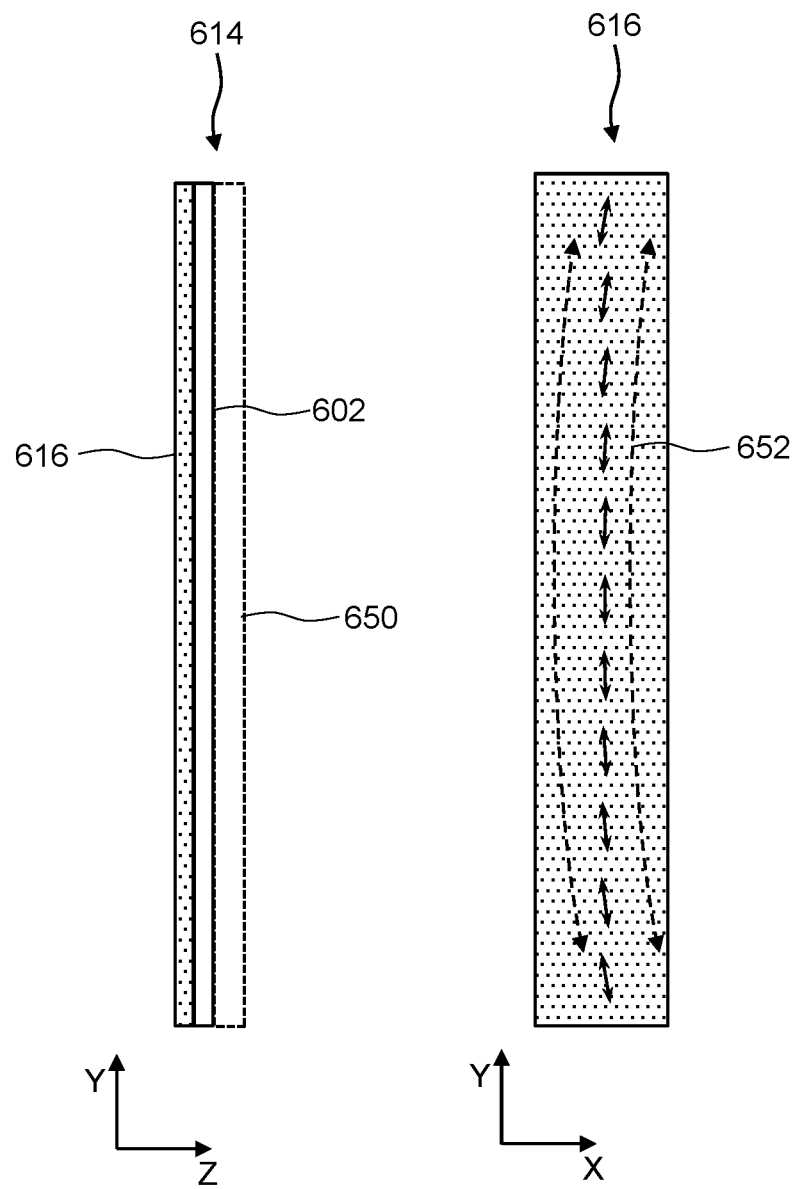
FIG. 6A is a side cross-sectional view of a half-wave retarder having a continuously variable optic axis direction, stacked with a linear transmission polarizer.
FIG. 6B is a plan view of the half-wave retarder of FIG. 6A.

Referring to FIGS. 6A and 6B, a continuously spatially variant compound polarizer 614 includes a uniform linear transmission polarizer 602 supported by, e.g. laminated on, an optional substrate 650. A half-wave retarder sheet 616 includes an in-plane bend 652, as shown in FIG. 6B. The bend is in the plane of the substrate 650, that is, in XY plane, and has a radius of curvature on that plane. The bend may be achieved e.g. by heating and stretching the half-wave retarder sheet 616. The in-plane bend 652 causes the polarization of an impinging light beam to rotate by an angle dependent on the local optic axis direction of the half-wave retarder sheet 616. Thus, the half-wave retarder sheet 616 creates an effect similar to rotation of the transmission axis direction by a continuously variant polarizer; accordingly, the continuously variant compound polarizer 614 operates similarly to the continuously variant linear transmission polarizer 414 of FIGS. 4A and 4B, providing a similar optical power density distribution at the output. The order of the retardation sheet 616 and the linear transmission polarizer 602 on the substrate 650 may be reversed. For polarizer configurations, the half-wave retarder sheet 616 is disposed downstream of the linear transmission polarizer 602 in the optical path of the light beam. For analyzer configurations, the half-wave retarder sheet 616 is disposed upstream of the linear transmission polarizer 602 in the optical path of the light beam.

Figures 7A, 7B:
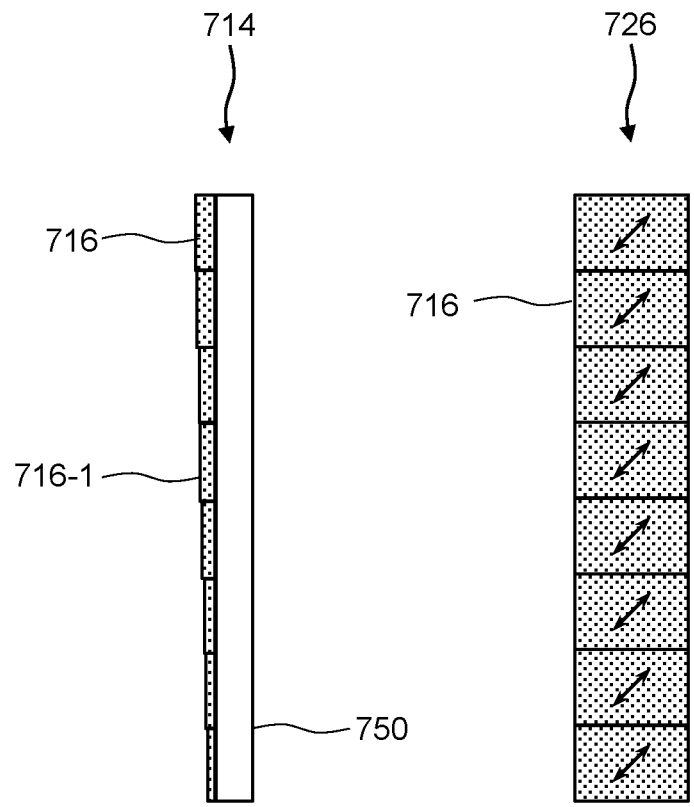
FIG. 7A is a side cross-sectional view of a segmented optical retarder with variable thickness and retardation.
FIG. 7B is a plan view of the segmented optical retarder of FIG. 7A.

Turning to FIGS. 7A and 7B, a segmented optical retarder 714 includes a linear array 726 of optical retarder segments 716, which may be supported by an optional substrate 750. The array 726 of the optical retarder segments 716 extends along Y-axis, i.e. along a width direction of an extended impinging optical beam, not shown. Each optical retarder segment 716 is disposed in XY plane. In the embodiment of FIGS. 7A and 7B, an optic axis direction of the optical retarder segments 716 is fixed at 45 degrees w.r.t. an edge of the substrate 750. More generally, the optic axis direction of the optical retarder segments 716 may be selected depending upon impinging optical beam polarization. The retardation of the optical retarder segments 716, represented by a thickness of the optical retarder segments 716 in FIG. 7A, varies along the Y-axis, i.e. monotonically increases in going from bottom to top of FIGS. 7A and 7B. The thickness and retardation of each optical retarder segment 716 is constant across that segment. The variation of the optical retardation from one optical retarder segment 716 to another optical retarder segment 716 may also be non-linear, e.g. square root, quadratic, polynomial, exponential, etc. Furthermore, the variation of the transmission axis direction may be non-monotonic in some embodiments. A selected linear transmission polarizer segment, e.g. a center optical retarder segment 716-1, may have a pre-determined retardation, e.g. 0.25 wavelengths of the impinging optical beam. The optical retardation of the optical retarder segments 716 may be within a pre-determined range, for example, 0.2 wavelengths to 0.3 wavelengths.

Referring to FIGS. 8A and 8B, a continuously spatially variant optical retarder 814 includes a retarder wedge 816 supported by an optional substrate 850. The retarder wedge 816 is disposed in XY plane and has a thickness varying along Y-axis, i.e. along the width direction of an extended impinging optical beam. Accordingly, optical retardation of the retarder wedge 816 varies smoothly and continuously along Y-axis. A selected location 816-1 of the retarder wedge 816 may have a pre-determined retardation, e.g. 0.25 wavelengths of the impinging optical beam. The optical retardation of the retarder wedge 816 may vary within a pre-determined range, for example, 0.2 wavelengths to 0.3 wavelengths. In the embodiment of FIGS. 8A and 8B, an optic axis direction of the retarder wedge 816 is fixed at 45 degrees w.r.t. an edge of the substrate 850. More generally, the optic axis direction of the retarder wedge 816 may be selected depending upon impinging optical beam polarization.

In some embodiments, the optical retardation of the retarder wedge 816 may vary within a much larger range, for example, tens or even hundreds of wavelengths. Such a retarder may be obtained e.g. by providing a wedge of a birefringent crystal such as quartz, for example. Furthermore, a pair of wedges may be provided, with their optic axes non-parallel e.g. at 45 degrees w.r.t. each other. When a birefringent crystal wedge is used to provide spatially variant polarization of the optical beam, the optical power density may exhibit many oscillations across the detector array.

Figures 9A, 9B:
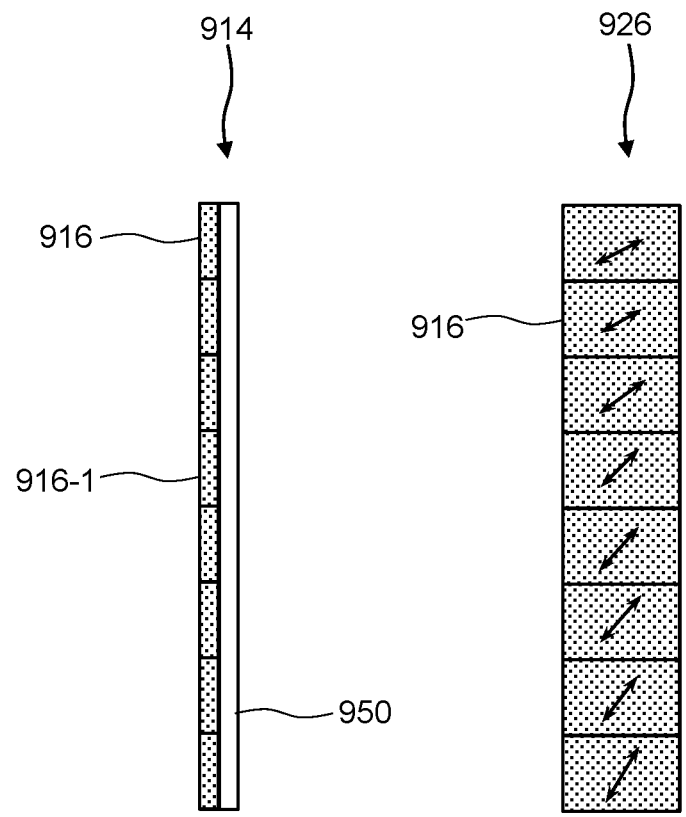
FIG. 9A is a side cross-sectional view of a segmented quarter-wave waveplate having a variable optic axis direction.
FIG. 9B is a plan view of the segmented quarter-wave waveplate of FIG. 9A.

Referring now to FIGS. 9A and 9B, a segmented optical retarder 914 includes a linear array 926 of optical retarder segments 916 supported by an optional substrate 950. The array 926 of the optical retarder segments 916 extends along Y-axis, i.e. along a width direction of an extended impinging optical beam, not shown. Each optical retarder segment 916 is disposed in XY plane. In the embodiment of FIGS. 9A and 9B, an optic axis direction of the optical retarder segments 716, shown with double-sided arrows, varies along Y-axis in going from one retarder segment 716 to another. The variation of the optic axis direction may linear or non-linear, e.g. square root, quadratic, polynomial, exponential, etc. Furthermore, the variation of the optic axis direction may be non-monotonic in some embodiments. A selected linear transmission polarizer segment, e.g. a center optical retarder segment 916-1, may be oriented in a pre-determined default direction, e.g. at 45 degrees w.r.t. an edge of the substrate 950.

Turning to FIGS. 10A and 10B, a continuously spatially variant optical retarder 1014 includes a quarter-wave retarder sheet 1016 supported by an optional substrate 1050. The quarter-wave retarder sheet 1016 includes an in-plane bend 1052, as shown in FIG. 10B. The bend is in the plane of the substrate 1050, that is, in XY plane, and has a radius of curvature on that plane. The bend causes an optic axis direction, shown with double-headed arrows, to vary along Y-axis, i.e. vertically in FIGS. 10A and 10B. The variation of the optic axis direction may linear or non-linear, e.g. square root, quadratic, polynomial, exponential, etc. Furthermore, the variation of the optic axis direction may be non-monotonic in some embodiments. A selected location 1016-1 of the quarter-wave retarder sheet 1016 may have a pre-determined orientation of the optic axis.

Other types of retarders with spatially variable optic axis direction may be used instead of the quarter-wave retarder sheet 1016 of FIGS. 10A and 10B, or the half-wave retarder sheet 616 of FIGS. 6A and 6B for that matter. For example, photo-aligned polymer-immersed liquid crystal materials may be used. Furthermore, a spatial light modulator (SLM) including tunable or switchable pixels may be used in place of the waveplates and/or retarders in FIGS. 1, 2A to 2H, 3A and 3B to 10A and 10B. By way of non-limiting examples, the SLM may be based on a liquid crystal layer in pi-cell or in-plane switching configurations.

Figure 11:
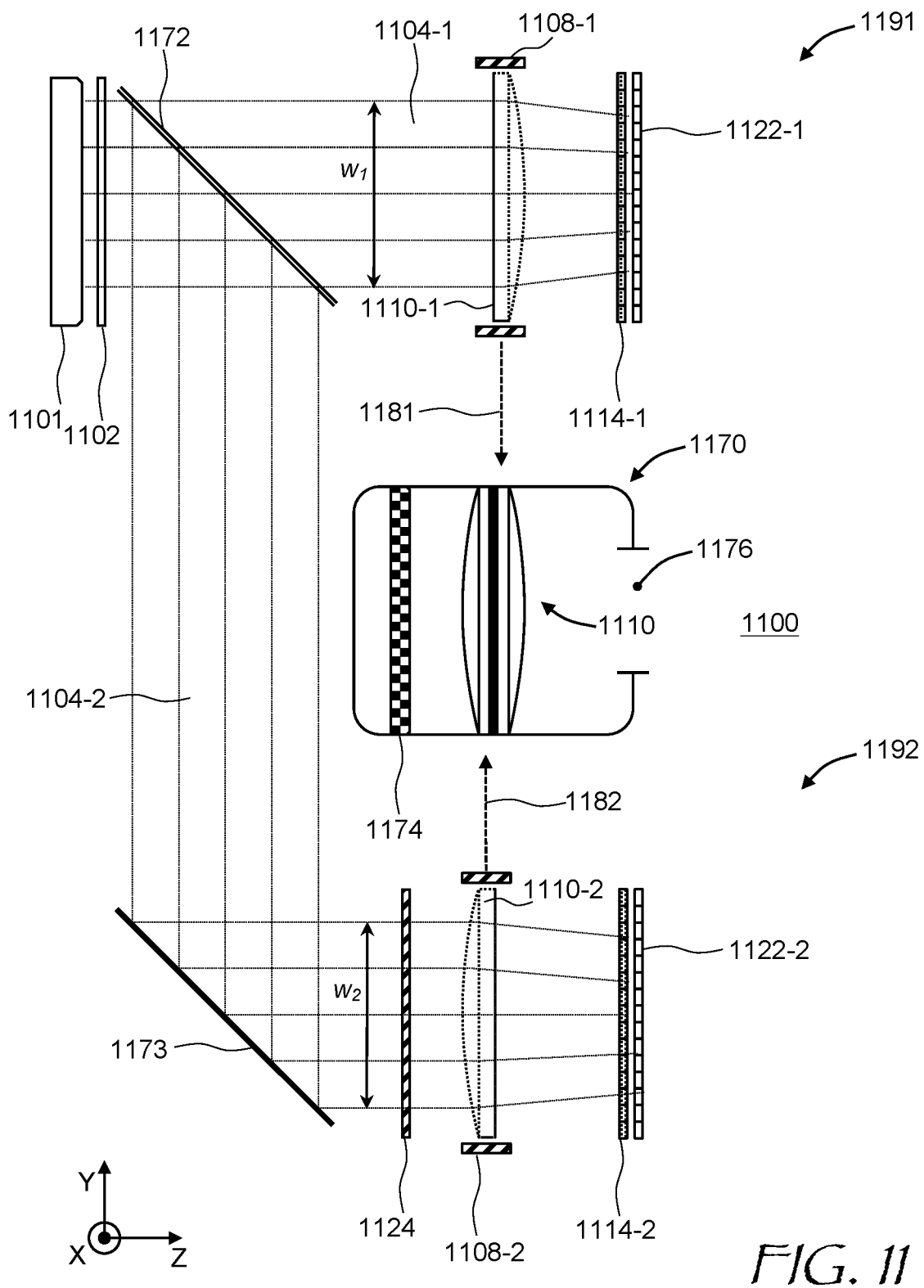
FIG. 11 is a plan cross-sectional view of an alignment system for aligning a pancake lens, the alignment system including a pair of alignment apparatuses of FIGS. 2A-2H.

Referring to FIG. 11, an alignment system 1100 for aligning a polarization device, e.g. a pancake lens 1110 of a head-mounted display (HMD) 1170 includes a light source

1101 for providing a first light beam 1104-1 having a width $w_1$ as measured along Y-axis. A linear polarizer 1102 may be disposed in a path of the first light beam 1104-1 to linearly polarize the first light beam 1104-1. A first alignment apparatus 1191 is similar to the alignment apparatus 200A of FIG. 2A. The first alignment apparatus 1191 (FIG. 11) includes a first rotary support 1108-1 for rotatably supporting a first polarization component 1110-1 of the pancake lens 1110 in a path of the first light beam 1104-1. In the embodiment shown, the first polarization component 1110-1 includes a downstream-facing plano-convex lens and a reflective polarizer on its flat side.

A first spatially variant polarization element 1114-1 having a polarization property varying along Y-axis may be disposed downstream of the first rotary support 1108-1. The first spatially variant polarization element 1114-1 may include any of the spatially variant polarization elements described above with reference to FIGS. 3A, 3B to 10A, 10B. The first spatially variant polarization element 1114-1 may function as an analyzer of the first light beam 1104-1 propagated through the first polarization component 1110-1. A first photodetector array 1122-1 extends along Y-axis. In operation, the first photodetector array 1122-1 detects a spatial optical power density distribution of the first light beam 1104-1 propagated through the first spatially variant polarization element 1114-1.

The alignment system 1100 may be further configured to provide a second light beam 1104-2 to an optional second alignment apparatus 1192 of the alignment system 1100. To that end, the alignment system 1100 may include a partially reflecting mirror 1172 for splitting off the second light beam 1104-2, and optionally a fully reflecting mirror 1173 for redirecting the second light beam 1104-2 towards the second alignment apparatus 2. The second light beam 1104-2 may have a width $w_2$ along Y-axis.

The second alignment apparatus 1192 is similar to the alignment apparatus 200C of FIG. 2C. The second alignment apparatus 2 (FIG. 11) includes a quarter-wave waveplate 1124 and a second rotary support 1108-2 for rotatably supporting a second polarization component 1110-2 of the pancake lens 1110 in a path of the second light beam 1104-2. In the embodiment shown, the second polarization component 1110-2 may include an upstream-facing plano-convex lens with a quarter-wave waveplate coupled to its planar side. A second spatially variant polarization element 1114-2 having a polarization property varying along the first axis is disposed downstream of the second rotary support 1108-2 for receiving the second light beam 1104-2 propagated through the second polarization component 2220-2. A second photodetector array 1122-2 is disposed downstream of the second spatially variant polarization element 1114-2. The second photodetector array 1122-2 may extend along Y-axis axis. In operation, the second photodetector array 1122-2 detects the second light beam propagated through the second spatially variant polarization element 1114-2. The second spatially variant polarization element 1114-2 and the second photodetector array 1122-2 may be oriented differently, i.e. along X-axis or in any other direction, not necessarily parallel to the direction of the first spatially variant polarization element 1104-1 and the first photodetector array 1122-1, for as long as the second light beam 1104-2 has a sufficient width in that direction.

In some embodiments of the alignment system 1100, the light source 1101 may be wavelength-selectable, i.e. the light source 1101 may provide the first 1104-1 and/or the second 1104-2 light beam at a selectable test wavelength, e.g. at a wavelength of a red color channel, a green color channel, and/or a blue color channel. The alignment may be performed sequentially at each of these wavelengths, and spatially variant polarizers may have to be rotated at different angles for each of the test wavelength. The final orientation of optical components being aligned may be selected to provide acceptable optical performance at each test wavelength.

In the embodiment shown, the alignment system 1100 further includes translation stages 1181 and 1182 for combining the first 1110-1 and second 1110-2 polarization components of the pancake lens 1110 after aligning by the first 1191 and second 1192 alignment apparatuses, respectively. The translation stages 1181 and 1182 may be configured to place the first 1110-1 and second 1110-2 polarization components into the HMD 1170 without changing their relative orientation obtained after alignment. This enables the pancake lens 1110 to operate properly, carrying an image generated by an electronic display panel 1174 to an eyebox 1176 of the HMD 1170 while suppressing ghost artifacts. Other variants of the alignment system 1100 may include separate light sources for the first 1191 and second 1192 alignment apparatuses. The first 1114-1 and second 1114-2 spatially variant polarization elements may be disposed downstream or upstream of the respective polarization devices or components to be aligned. Furthermore, in some embodiments, a single spatially variant polarization element may be used with a single light source. Many other polarization devices or components may be aligned by the alignment system 1100, including a reflective or transmissive polarizer, a waveplate, an optical element with laminated polarizer and/or a waveplate, an optical retarder film, a Pancharatnam-Berry phase (PBP) liquid crystal (LC) lens or grating, a volume holographic grating or lens, a hyperbolic metamaterial, etc., as well as any combination of the above polarization components.

Figure 12:
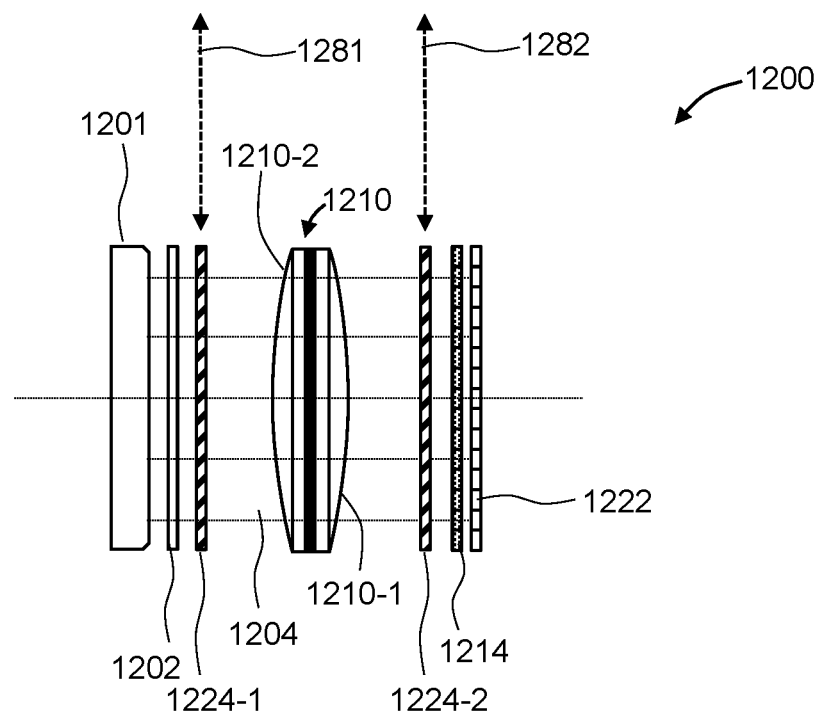
FIG. 12 is a plan cross-sectional view of an alignment system for ins-situ alignment of a pancake lens.

Referring now to FIG. 12, an alignment system 1200 for aligning a polarization device 1210 having multiple polarization components 1210-1, 1210-2 includes a light source 1201 for providing a light beam 1204 of a finite width, a linear polarizer 1202 for polarizing the light beam, and waveplates 1224-1 and 1224-2 upstream and downstream of the polarization device 1210, respectively. The waveplates 1224-1 and 1224-2 can be retracted and inserted into the light beam 1204 by translation stages 1281 and 1282. A rotary support (not shown for brevity) may be provided for independently rotating the polarization components 1210-1, 1210-2. A spatially variant polarization element 1214 is disposed downstream of the polarization device 1210, and a photodetector array 1222 is provided for measuring an optical power density distribution at the output of the spatially variant polarization element 1214. The waveplates 1224 may include quarter-wave waveplates, half-wave waveplates, etc., and may be rotatable. The spatially variant polarization element 1214 may be placed onto its own translation stage for optional removal from the light beam 1204, and may include any of the polarization elements of FIGS. 3A, 3B to 10A, 10B. Additional linear polarizers may be provided in the path of the light beam 1204. In this example, the first polarization component 1210-1 includes a reflective polarizer, and the second polarization component 1210-2 includes a quarter-wave waveplate.

The alignment system 1200 enables alignment of the polarization components 1210-1, 1210-2 when all, or at least more than one, of these components are present in the path of the light beam 1204. For example, to align the first polarization component 1210-1 including a reflective polarizer element, the first 1224-1 and second 1224-2 second waveplates may be retracted from the optical beam 1204, and the first polarization component 1210-1 may be rotated to provide a strong attenuation of the optical beam 1204 by the spatially variant polarization element 1214 at the middle of the photodetector array 1222. Then, the second waveplate 1224-2 may be inserted into the optical beam 1204, and the second polarization component 1210-2 may then be aligned. Alternatively, both first 1210-1 and second 1210-2 polarization components may be aligned iteratively, in turns, until a desired optical power density distribution has been obtained at the photodetector array 1222.

Figure 13:
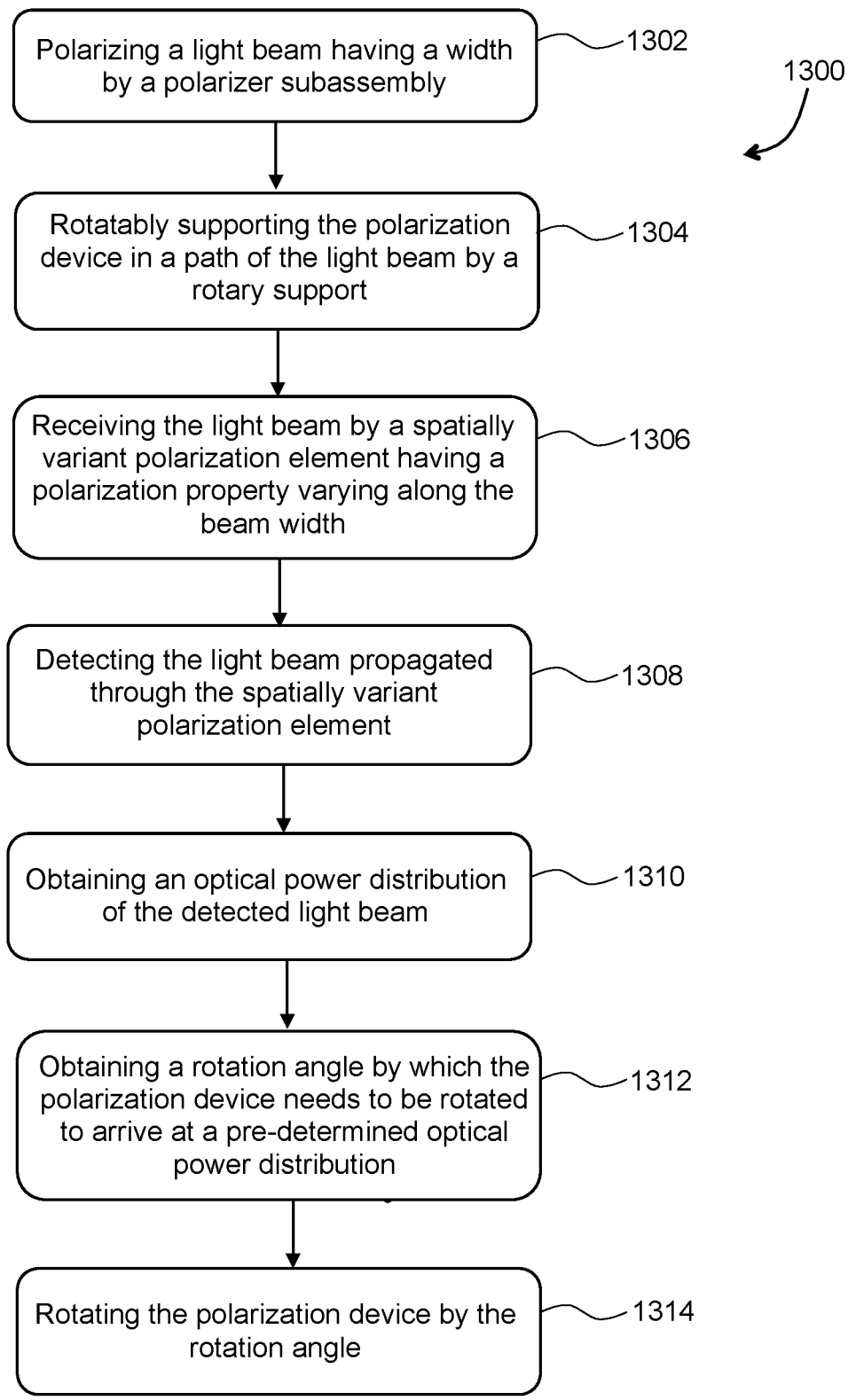
FIG. 13 is a flowchart of a method for aligning a polarization device.

Turning to FIG. 13, a method 1300 for aligning a polarization device includes polarizing (1302) a light beam having a width along a first axis, e.g. Y-axis. The light beam may be polarized using a suitable polarization element or, more generally, a polarizer subassembly which may include polarizers, waveplates, etc. The polarization may be e.g. linear, circular, or elliptical. The light beam may be wide enough to illuminate the polarization device across its clear aperture along Y-axis. The polarization device to be aligned may be rotatably supported (1304) in a path of the light beam by a rotary support enabling the polarization device rotation in the light beam path, for example, about an axis parallel to the light beam path. The polarization device may be rotated while being illuminated by the light beam, or in an interval between separate successive illuminations of the polarization device. The light beam propagates through the polarization device and is received (1306) at an analyzer subassembly. For example, the light beam can be received by a spatially variant polarization element having a polarization property varying across the beam, i.e. along Y-axis disposed laterally with respect to the beam. The light beam propagated through the analyzer subassembly is then detected (1308) by a photodetector array disposed downstream of the analyzer subassembly and extending along Y-axis.

The method 1300 may further include obtaining (1310) an optical power distribution of the detected light beam. As has been explained above with reference to FIG. 1, the optical power density distribution detected by the photodetector array may be representative of the angle(s) of rotation of the polarization device away from an optimal angle of rotation corresponding to a pre-determined optical power distribution. The pre-determined optical power distribution may be substantially symmetric relative to a selected photodetector of the photodetector array. The angle may be obtained (1312) and then, the polarization device may be rotated (1314) by the obtained rotation angle to match the pre-determined optical power distribution. The polarization device may include a plurality of individually rotatable or adjustable polarization components; these may be aligned one-by-one or in a parallel iterative manner. A spatially variant polarization element may be disposed upstream, downstream, or both upstream and downstream of the polarization device being aligned.

Figure 14:
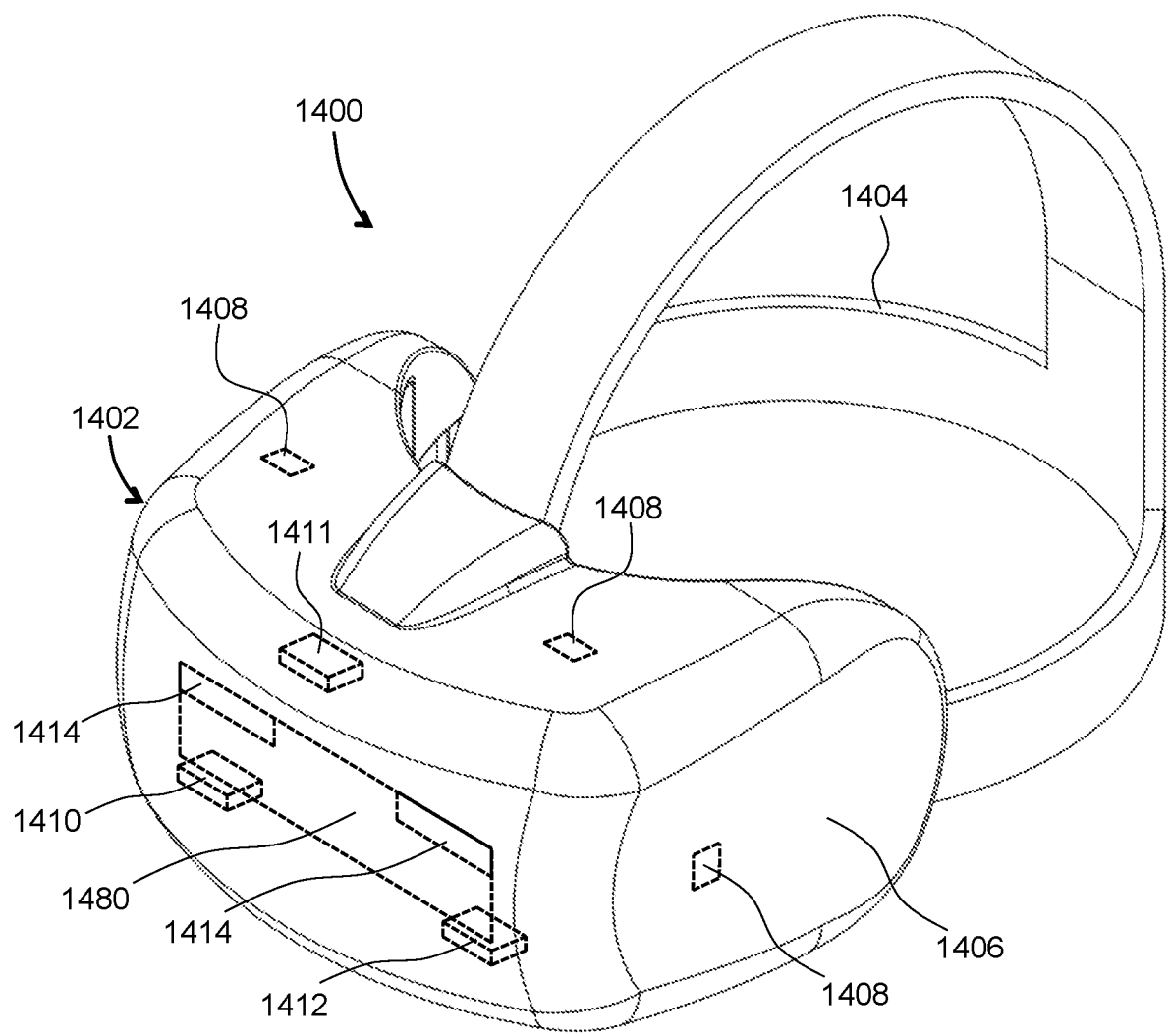
FIG. 14 is an isometric view of a head-mounted display including a polarization device of the present disclosure.

Referring to FIG. 14, an HMD 1400 is an example of an AR/VR wearable display system. The function of the HMD 1400 is to augment views of a physical, real-world environment with computer-generated imagery, and/or to generate the entirely virtual 3D imagery. The HMD 1400 may include a front body 1402 and a band 1404. The front body 1402 is configured for placement in front of eyes of a user in a reliable and comfortable manner, and the band 1404 may be stretched to secure the front body 1402 on the user's head. A display system 1480 may be disposed in the front body 1402 for presenting AR/VR imagery to the user. Sides 1406 of the front body 1402 may be opaque or transparent. The display system 1480, or any other optical (sub)system of the HMD 1400 may use pancake lenses or other polarization devices that can be aligned using the alignment apparatus 100 of FIG. 1, alignment apparatuses 200A to 200H of FIGS. 2A to 2H, respectively, the alignment system 1100 of FIG. 11, and/or the alignment system 1200 of FIG. 12.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. To that end, the DCA 1411 may include a laser radar (LIDAR), or a similar device. The depth information may be compared with the information from the IMU 1410, for better accuracy of determination of position and orientation of the HMD 1400 in 3D space.

The HMD 1400 may further include an eye tracking system 1411 for determining orientation and position of user's eyes in real time. The obtained position and orientation of the eyes also allows the HMD 1400 to determine the gaze direction of the user and to adjust the image generated by the display system 1480 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided, including e.g. a set of small speakers built into the front body 1402.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An alignment apparatus for a polarization device, the alignment apparatus comprising:
   a polarizer subassembly for polarizing a light beam having a width along a first axis;
   a rotary support for rotatably supporting the polarization device in a path of the light beam downstream of the polarizer subassembly;
   an analyzer subassembly downstream of the rotary support for receiving the light beam propagated through the polarization device; and
   a photodetector array downstream of the analyzer subassembly, the photodetector array extending along the first axis for detecting the light beam propagated through the analyzer subassembly;
   wherein the polarizer subassembly comprises a spatially variant polarization element having a polarization property varying along the first axis, and wherein the analyzer subassembly comprises a linear transmission polarizer.

2. The alignment apparatus of claim 1, wherein the analyzer subassembly further comprises a quarter-wave waveplate upstream of the linear transmission polarizer.

3. The alignment apparatus of claim 1, wherein the spatially variant polarization element comprises an array of polarizer segments, the array extending along the first axis, wherein a transmission axis direction of the polarizer segments varies from polarizer segment to another polarizer segment of the array of polarizer segments.

4. The alignment apparatus of claim 1, wherein the polarization device comprises a pancake lens polarization component.

5. An alignment apparatus for a polarization device, the alignment apparatus comprising:
   a polarizer subassembly for polarizing a light beam having a width along a first axis;
   a rotary support for rotatably supporting the polarization device in a path of the light beam downstream of the polarizer subassembly;
   an analyzer subassembly downstream of the rotary support for receiving the light beam propagated through the polarization device; and
   a photodetector array downstream of the analyzer subassembly, the photodetector array extending along the first axis for detecting the light beam propagated through the analyzer subassembly;
   wherein at least one of the polarizer or analyzer subassemblies comprises a spatially variant polarization element having a polarization property varying along the first axis;
   wherein the spatially variant polarization element comprises at least one of:
   a linear transmission polarizer extending along the first axis and having a transmission axis direction smoothly and continuously varying along the first axis;
   an array of half-wave waveplate segments extending along the first axis, wherein an optic axis direction of the half-wave waveplate segments of the array of half-wave waveplate segments varies from half-wave waveplate segment to another half-wave waveplate segment of the array of half-wave waveplate segments, and a linear polarizer downstream of the first array;
   a half-wave optical retarder extending along the first axis and having an optic axis direction smoothly and monotonically varying along the first axis, and a linear polarizer downstream of the half-wave optical retarder;
   an array of optical retarders extending along the first axis, wherein at least one of a retardation or an optic axis direction of the optical retarders of the array of optical retarders varies from optical retarder to another optical retarder of the array of optical retarders; or
   an optical retarder extending along the first axis and having at least one of an optical retardation or an optic axis direction smoothly and continuously varying along the first axis.

6. The alignment apparatus of claim 5, wherein the spatially variant polarization element comprises the array of optical retarders, wherein the retardation of the optical retarders of the array of optical retarders varies between 0.2 and 0.3 wavelengths of the light beam.

7. A method for aligning a polarization device, the method comprising:
   polarizing a light beam having a width along a first axis by a polarizer subassembly;
   rotatably supporting the polarization device in a path of the light beam by a rotary support;
   receiving the light beam propagated through the polarization device at an analyzer subassembly; and
   detecting the light beam propagated through the analyzer subassembly by a photodetector array disposed downstream of the analyzer subassembly and extending along the first axis;
   wherein the polarizer subassembly comprises a spatially variant polarization element having a polarization property varying along the first axis, and wherein the analyzer subassembly comprises a linear transmission polarizer.

8. The method of claim 7, further comprising:
   obtaining an optical power distribution of the light beam detected by the photodetector array; and
   obtaining a rotation angle of the polarization device to make the optical power distribution match a pre-determined optical power distribution.

9. The method of claim 8, further comprising rotating the rotary support by the rotation angle.

* * * * *